United States Patent [19]

Stahl

[11] Patent Number: 4,563,105
[45] Date of Patent: Jan. 7, 1986

[54] CLEVIS AND METHOD OF MANUFACTURE

[76] Inventor: Benedict J. Stahl, 12282 Woodbine Ave., Gregory, Mich. 48239

[21] Appl. No.: 588,699

[22] Filed: Mar. 12, 1984

[51] Int. Cl.⁴ .............................................. F16C 11/00
[52] U.S. Cl. ................................... 403/157; 403/271; 29/175 A
[58] Field of Search ........................ 403/157, 79, 271; 29/175 A; 228/173.5; 74/579 R

[56] References Cited

U.S. PATENT DOCUMENTS

| 2,019,460 | 10/1935 | Mahan | 74/579 X |
| 2,480,958 | 9/1949 | Pietzsch | 403/79 |
| 2,696,998 | 12/1954 | Roby | 403/157 |
| 4,034,946 | 7/1977 | Zimmer, Jr. | 403/157 X |
| 4,414,726 | 11/1983 | Cale, Jr. | 403/157 X |

Primary Examiner—Andrew V. Kundrat
Attorney, Agent, or Firm—Brooks & Kushman

[57] ABSTRACT

A clevis includes a shaft and a pair of tangs bifurcating from one end of the shaft. One of the tangs is an integral extension of the shaft. The other tang is formed from a mating piece and is affixed to the shaft by a welded joint which extends along the axial dimension of the shaft. The clevis is preferably formed of cold drawn wire steel and the tangs and welded surfaces are formed by bending and coining operations.

16 Claims, 8 Drawing Figures

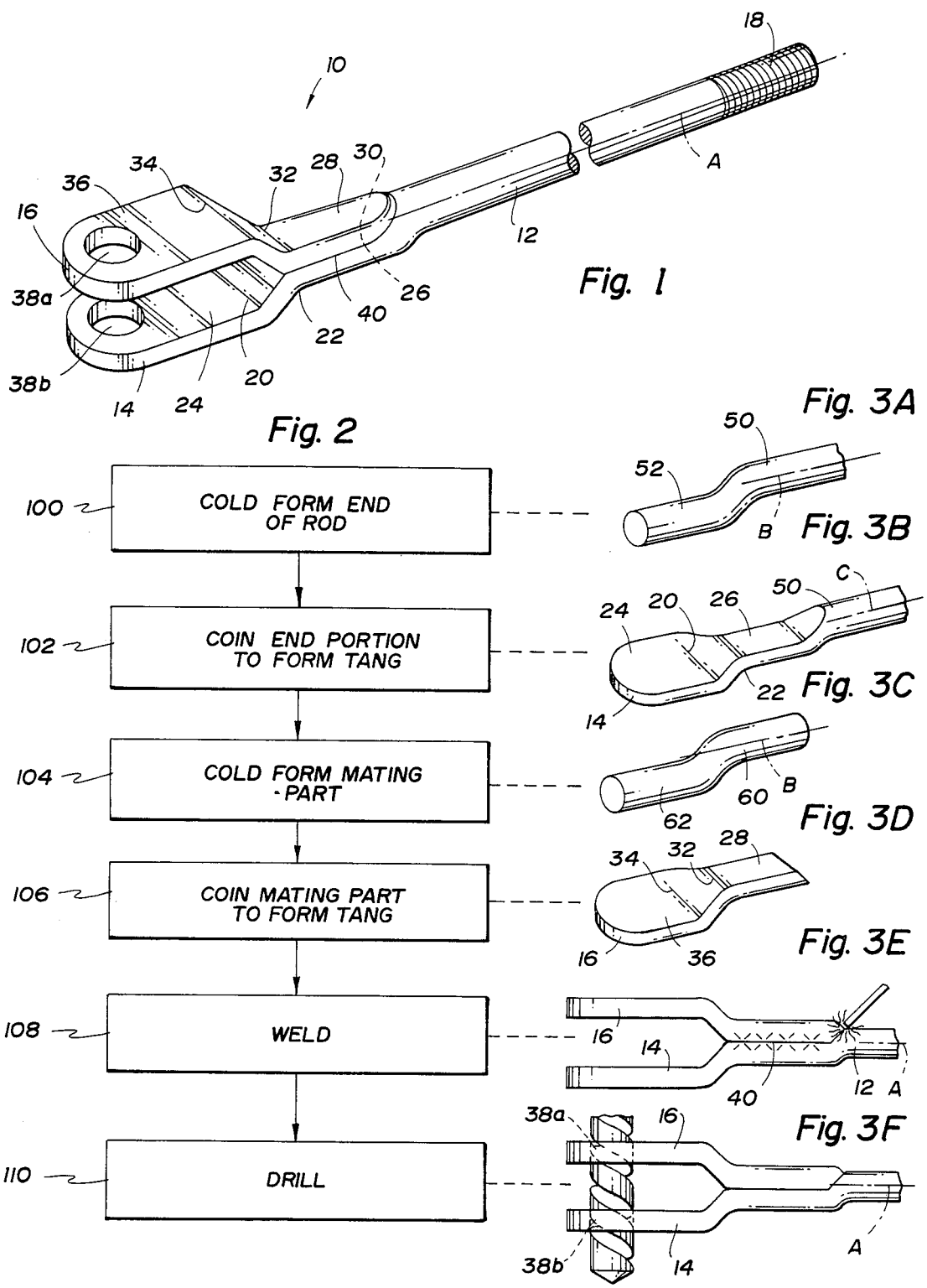

CLEVIS AND METHOD OF MANUFACTURE

TECHNICAL FIELD

This invention relates to a clevis and its method of manufacture by a number of cold forming steps.

BACKGROUND ART

The clevis is a well known mechanical device for interconnecting mechanical members. It most generally comprises a shaft which divides at one end into a pair of tangs that couple to a cooperative member, sometimes by use of a clevis pin.

An objective of the present invention is the design of a clevis which provides relatively high loading strength but which is also simple to manufacture and offers design flexibility for varying applications.

In considering loading strength one important factor is the stress concentration at the point where the tangs bifurcate from the shaft. In accordance with the present invention, one of the tangs has been chosen to be formed integrally with the shaft as a cold formed extension of the shaft. The other tang is welded to the shaft adjacent the point of bifurcation.

The prior art illustrates a clevis of the design thus far described in the patent to Roby, U.S. Pat. No. 2,696,998. However, in Roby the weld occurs at the vertex defined by the juncture of the tangs. The weld occurs at the most stress vulnerable point and thus it appears that the loading capability of the Roby clevis is limited by this feature.

Other references which show various clevis embodiments and are of general interest in this context are shown in U.S. Pat. Nos. 2,157,713; 2,022,801; 2,527,479; 4,196,642; and 4,365,909.

DISCLOSURE OF THE INVENTION

The present invention provides a clevis design and method of manufacture which feature relatively high loading strength, precision and flexibility in design and ease of manufacture, including economy and short lead times.

In the preferred embodiment this is accomplished by forming a clevis from cold drawn wire steel where one of the tangs is integral with the shaft. The other tang is affixed to the shaft by a welded joint extending along the axial dimension of the shaft.

Each tang can be formed into a desired shape by bending and coining operations.

BRIEF DESCRIPTION OF THE DRAWING

FIG. 1 is a perspective view of a clevis manufactured in accordance with the present invention;

FIG. 2 is a flow chart of the manufacturing steps employed in the preferred practice of the invention; and FIGS. 3A-F are views of the clevis or portions thereof as work-in-process corresponding to the steps of FIG. 2.

BEST MODE FOR CARRYING OUT THE INVENTION

FIG. 1 illustrates a clevis, generally at 10, made in accordance with the present invention. The clevis 10 comprises a shaft 12 having a pair of tangs 14 and 16 bifurcating from one end thereof. The opposite end 18 of the shaft 12 is threaded to permit coupling with a cooperative threaded fastener.

The tang 14 is integral with the shaft 12 and formed as an extension of the shaft. The tang 14 is stepped or offset from the longitudinal axis A of the shaft 12 by a pair of bends 20 and 22. In the embodiment of FIG. 1 the tang 14 is formed with a blade-type end, such as at 24, but the invention is not limited to this specific embodiment.

An axial segment on the shaft 12 is formed to have a mating surface 26 (as best seen in FIG. 3B). The mating surface 26 is complementary in shape to another mating surface 30 on a flange segment 28 of the tang 16. The mating surface 26 is radially offset from the longitudinal axis A of the shaft 12.

The tang 16 is formed from a separate piece of stock and is likewise offset from the longitudinal axis A of the shaft 12 by a pair of bends 32 and 34. Also, the tang 16 is formed with a blade-type end 36. The relative disposition of the tangs 14 and 16 is such that they are in symmetric relation about the longitudinal axis of the shaft. A pair of aligned holes 38 a and b are formed in the respective blades 36 and 24 to accept a connecting member, such as a clevis pin (not shown).

The tang 16 is affixed to the shaft 12 by welding the mating surfaces 26 and 30 to one another. The welded joint 40 so defined extends along the axial dimension of the shaft 12.

With reference to FIGS. 2 and 3 A-F, the process employed in realizing the clevis of FIG. 1 is described.

In step 100, a piece of cold drawn wire steel is double bent to form a main segment 50 of an offset end segment 52.

In step 102, the end segment of 52 and the double bend is flattened by coining to define the tang 14 with the end blade 24 and the mating surface 26. The bends are shown at 20 and 22. The main segment 50 corresponds to the shaft 12 of FIG. 1.

In step 104, another piece of cold drawn wire steel is double bent to form a main segment 60 and an offset segment 62.

In step 106, this piece is flattened by coining to define the tang 16 with the end blade 36 and mating surface 28. The bends are shown at 32 and 34.

In step 108, the tangs 14 and 16 are welded together along a line of joinder 40 which extends along the axial dimension of the shaft 12. The weld affixes the mating surfaces 26 and 30 to one another.

In step 110, the holes 38 a and b are drilled.

While a preferred embodiment of the invention has been shown and described herein in detail, those skilled in the art will recognize various alternative designs and embodiments for practicing the present invention as defined by the following claims.

I claim:

1. A clevis comprising:
   a shaft,
   first and second tangs bifurcating from one end of the shaft,
   said first tang being formed as an integral extension of the shaft, and
   said second tang being affixed to the shaft by a welded joint extending along the axial dimension of the shaft wherein at least one of said tangs is coined.

2. The clevis of claim 1 wherein the second tang has a flange segment with a surface formed thereon for mating with a like surface formed on the shaft proximate the point of bifurcation.

3. The clevis of claim 2 wherein the shaft and tangs are formed of wire stock and said mating surfaces are formed by a coining operation.

4. The clevis of claim 2 wherein the mating surface on the shaft is offset from the longitudinal axis of the shaft.

5. The clevis of claim 4 wherein the tangs are disposed in substantially symmetric relation about the longitudinal axis of the shaft.

6. The clevis of claim 1 wherein the shaft and tangs are formed of wire stock and the tangs are coined to form flat surfaces thereon.

7. The clevis of claim 1 wherein the shaft is formed of wire stock and has an opposed end terminating in means suited for coupling with a cooperating member.

8. The clevis of claim 7 where said opposed end of the shaft is threaded.

9. The clevis of claim 1 wherein the first and second tangs have aligned apertures formed therein for receiving a cooperative member.

10. The clevis of claim 1 wherein the shaft and tangs are formed of cold drawn wire steel.

11. A method for forming a clevis comprising the steps of:
 bending an end segment of a main piece of wire stock to offset it from the longitudinal axis of the wire stock;
 coining the end segment to define a first, integral tang and a portion of the wire stock adjacent the end segment to define a mating surface;
 bending a mating piece of wire stock to offset a segment from the longitudinal axis of the mating piece;
 coining the mating piece to define a second tang from the offset segment and a flange with a mating surface thereon;
 affixing the mating piece to the main piece by joining the respective mating surfaces by a line of joinder extending parallel to the longitudinal axis of the main piece.

12. The method of claim 11 wherein said bending and coining steps are by cold forming operations.

13. The method of claim 11 wherein the mating surfaces are joined by welding.

14. The method of claim 11 including the further step of forming aligned holes in the first and second tangs to receive a cooperative member.

15. A method for forming a clevis comprising the steps of:
 bending an end segment of a main piece of wire stock to offset it from the longitudinal axis of the wire stock, the end segment defining a first integral tang and a portion of the wire stock adjacent the end segment defining a mating surface;
 bending a mating piece of wire stock to offset a segment from the longitudinal axis of the mating piece;
 coining the mating piece to define a second tang from the offset segment and a flange with a mating surface thereon; and
 affixing the mating piece to the main piece by joining the respective mating surfaces by a line of joinder extending parallel to the longitudinal axis of the main piece.

16. A method for forming a clevis comprising the steps of:
 bending an end segment to define a first, integral tang and a portion of the wire stock adjacent the end segment to define a mating surface;
 bending a mating piece of wire stock to offset a segment from the longitudinal axis of the mating piece, the offset segment defining a second tang and the portion of the mating piece adjacent the offset segment defining a flange with a mating surface thereon;
 affixing the mating piece to the main piece by joining the respective mating surfaces by a line of joinder extending parallel to the longitudinal axis of the main piece.

* * * * *